United States Patent [19]

Durante et al.

[11] Patent Number: 5,535,397
[45] Date of Patent: Jul. 9, 1996

[54] METHOD AND APPARATUS FOR PROVIDING A CONTEXT SWITCH IN RESPONSE TO AN INTERRUPT IN A COMPUTER PROCESS

[75] Inventors: Richard J. Durante, Citrus Heights; Keith F. Underwood, Orangevale, both of Calif.

[73] Assignee: Intel Corporation, Santa Clara, Calif.

[21] Appl. No.: 85,409

[22] Filed: Jun. 30, 1993

[51] Int. Cl.⁶ .................................................. G06F 9/46
[52] U.S. Cl. .................................... 395/740; 395/734
[58] Field of Search ........................... 395/400, 650, 395/725, 750, 740

[56] References Cited

U.S. PATENT DOCUMENTS

| | | | |
|---|---|---|---|
| 4,922,414 | 5/1990 | Holloway et al. | 395/400 |
| 4,972,312 | 11/1990 | den Boef | 395/725 |
| 4,975,836 | 12/1990 | Hirosawa et al. | 395/725 |
| 5,050,067 | 9/1991 | McLogan et al. | 395/725 |
| 5,155,853 | 10/1992 | Mitsuhiro et al. | 395/725 |
| 5,161,226 | 11/1992 | Wainer | 395/650 |
| 5,367,697 | 11/1994 | Barlow et al. | 395/750 |

*Primary Examiner*—Jack B. Harvey
*Assistant Examiner*—David A. Wiley
*Attorney, Agent, or Firm*—Blakely, Sokoloff, Taylor & Zafman

[57] ABSTRACT

A processor which includes at least a pair of call stacks and a pair of register files which may be utilized for running processes. The processor includes circuitry for detecting when an interrupt has occurred and switching from a stack and registers being utilized by a running process to a clean stack and registers to be utilized by the interrupting process. The processor then runs an interrupt start process which places the process interrupted and the circuitry utilized by that process into a condition in which the process may be safely interrupted. Similarly, the process circuitry detects when the interrupt is completed, performs a context switch in which the original stack and register are again made available, and switches to a process adapted to place the interrupted routine in an appropriate state to restart.

19 Claims, 7 Drawing Sheets

METHOD AND APPARATUS FOR PROVIDING A CONTEXT SWITCH IN RESPONSE TO AN INTERRUPT IN A COMPUTER PROCESS

BACKGROUND OF THE INVENTION

1. Field of the Invention

This invention relates to computer systems and, more particularly, to methods and apparatus for providing a context switch when an interrupt in a computer process occurs.

2. History of the Prior Art

Historically, when a computer process is running and it is necessary to interrupt that process and run another process which should be run before the running process completes, the computer processor stops running the process, stores in some convenient memory the various information about the process being run which establishes the context of that process and which is necessary to restart that process, then utilizes the registers of the processor to run the interrupting process until it is complete, and finally recalls the information relating to the interrupted process to the registers, and recommences running the interrupted process.

In general, this is a relatively straight forward but slow operation since memory must be accessed a number of times to store and recall the information relating to the state of the process which is interrupted. However, there are situations in which such a straight-line interrupt operation cannot be used. For example, a new form of memory referred to as flash electrically-erasable programmable read only memory (flash EEPROM) has recently been developed as a substitute for conventional long term storage such as hard disk drives. This flash EEPROM memory utilizes an array of floating gate field effect transistors which are placed into erased and programmed states by varying the charge on the floating gate. Typically, the devices are placed in the erased condition by providing a high positive voltage such as twelve volts on the source terminals of all of the devices in a selected block of the array while grounding the gate terminals and floating the drain terminals of the devices in the block. For various reasons, the erase process is quite time consuming and may take as long as two seconds. Typically, each device is individually programmed by applying a high voltage such as twelve volts to the gate terminal while applying a lower voltage to the drain terminal and grounding the source terminal. In contrast to erasing, programming is a very rapid process. The devices are read by applying much lower voltages to the gate terminals of the devices and determining the tendency of each device to transfer current.

Because flash EEPROM arrays are erased and programmed by levels of voltage which are much higher than are the normal voltages used to interrogate the array, these erasing and programming voltages must be applied in very precise sequences at very precise times in order to operate the array without loss of data or harm to the array. However, because the erase process is such a time consuming process, it is often desirable to interrupt that process in order to accomplish other operations. When the erase process is interrupted, it is necessary that the a number of tasks be completed in addition to the normal tasks typical to an interrupt. For example, it is necessary that the various sources of high voltage be shut down in an orderly fashion so that the data and the devices of the array not be harmed. When the interrupting process has completed, it is necessary that the various steps required for restarting the erase process be completed in an orderly fashion with the high voltages being reapplied at the appropriate point in the sequence of the erase operation so that damage to the devices of the array or the data stored does not occur. This may mean that the interrupted process cannot not be restarted without running one or more intervening processes required for startup of the erase or other interrupted process rather than simply returning to the interrupted process where it was interrupted.

An arrangement has been designed which accomplishes just such a unique interrupt operation. Such an arrangement is described in detail in U.S. patent application Ser. No. 08/086,186, entitled *Flash Memory Array System and Method*, M. Fandrich et al, filed on even date herewith, and assigned to the assignee of the present invention. The arrangement includes an interrupt start process or routine (ISR) and an interrupt return process (IRR). The ISR process and the IRR process are included in each interruptible process (such as the erase process) and guide the processor through the steps peculiar to the process being interrupted to provide an orderly shutdown and restart so that the array is not adversely affected. It will be appreciated that the necessity to provide these ISR and IRR processes in the software of each interruptible process lengthens the interrupt operation substantially. For this reason it is very desirable to provide circuitry and a method by which any interruptible process may be accelerated when a processor utilizes this type of interrupt.

SUMMARY OF THE INVENTION

It is, therefore, an object of the present invention to provide circuitry for increasing the speed at which the interruption of processes is handled by a processor.

It is another, more specific, object of the present invention to provide a apparatus and a method for accelerating the operation of context switching in a processing unit of a computer.

These and other objects of the present invention are realized in a processor which includes at least a pair of call stacks and a pair of register files which may be utilized for running processes. The processor includes circuitry for detecting when an interrupt has occurred and switching from a stack and register files being utilized by a running process to a clean stack and register files to be utilized by the interrupting process. The processor then runs an interrupt start process which places the process interrupted and the circuitry utilized by that process into a condition in which the process may be safely interrupted. Similarly, the processor circuitry detects when the interrupt is completed, performs a context switch in which the original stack and register are again made available, and switches to a process adapted to place the interrupted routine in an appropriate state to restart. The arrangement for detecting the completion of an interrupt provides an especially rapid context switch.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION OF THE INVENTION

Figure 1:
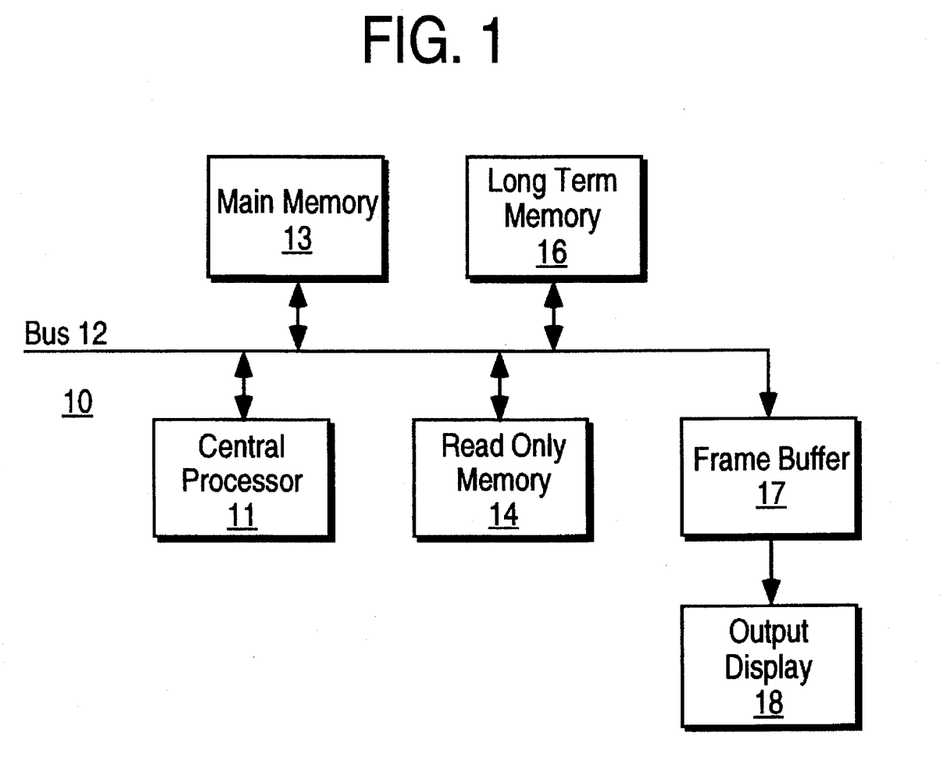
FIG. 1 is a block diagram illustrating a computer system including the present invention.

Referring now to FIG. 1, there is illustrated a computer system 10. The system 10 includes a central processor 11 which carries out the various instructions provided to the computer 10 for its operations. The central processor 11 is joined to a bus 12 adapted to carry information to various components of the system 10. Joined to the bus 12 is main memory 13 which is typically constructed of dynamic random access memory arranged in a manner well known to those skilled in the prior art to store information during the period in which power is provided to the system 10. Also joined to the bus 12 is read only memory 14 which may include various memory devices such as EPROM devices well known to those skilled in the art which are adapted to retain a memory condition in the absence of power to the system 10. The read only memory 14 typically stores various basic functions used by the processor 11 such as basic input output processes and startup processes.

Also connected to the bus 12 are various peripheral components such as long term memory 16 and circuitry such as a frame buffer 17 to which data may be written which is to be transferred to an output device such as a monitor 18 for display. The construction and operation of electro-mechanical hard disk drives typically used as long term memory 16 is well known to those skilled in the art. However, rather than the typical electro-mechanical hard disk drive, a flash EEPROM memory array may be used as the long term memory 16. Such flash EEPROM memory arrays are programmed and erased through techniques which utilize voltages greater than those typically available to the integrated circuits of more advanced portable computers.

Figure 2:
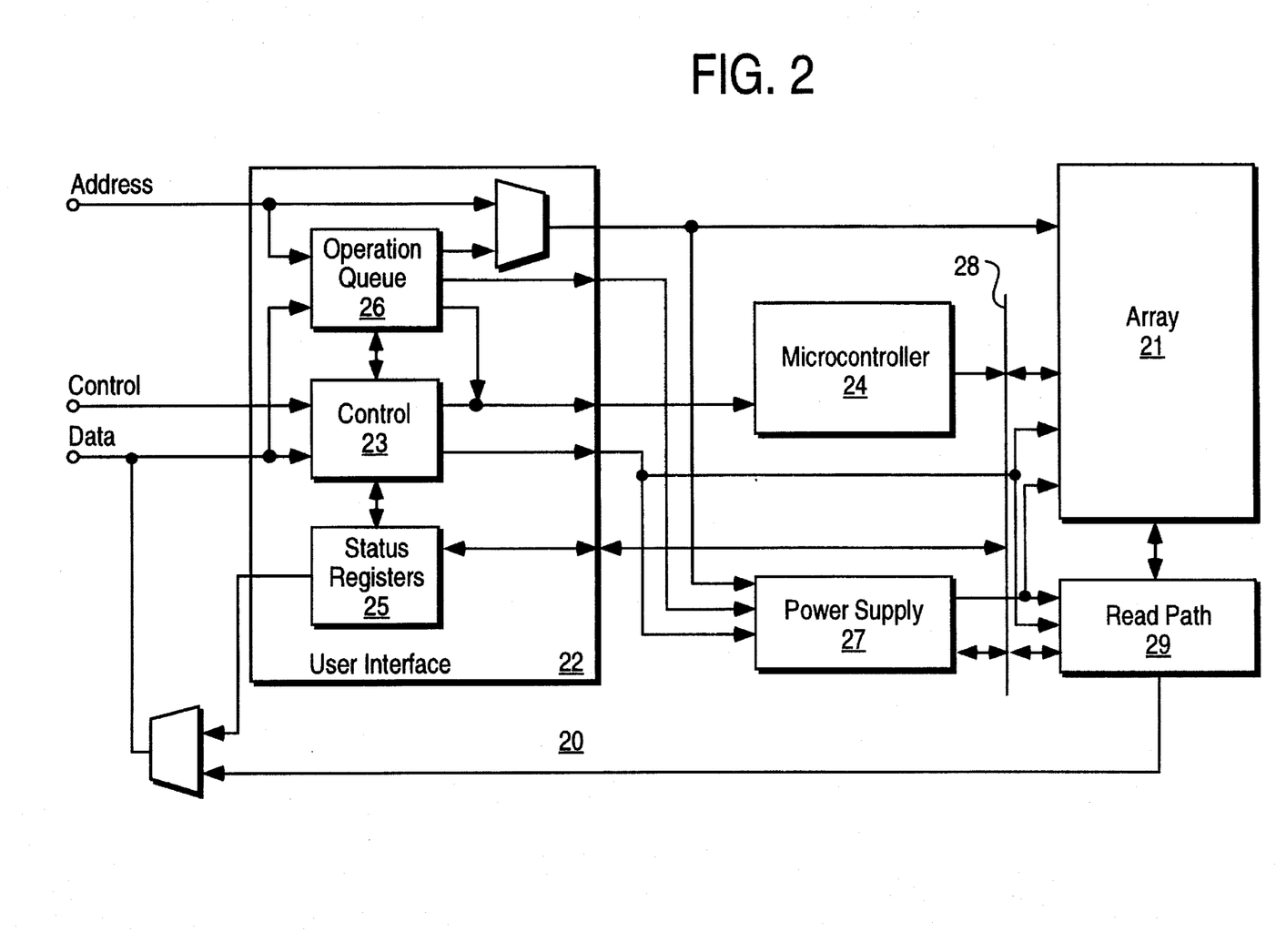
FIG. 2 is a block diagram illustrating, in general, the design of a long term memory array which may be used in FIG. 1.

FIG. 2 is a block diagram illustrating a flash EEPROM memory 20 which may be adapted to be utilized as long term memory in a computer system such as that illustrated in FIG. 1. The memory 20 includes an array 21 which may be comprised of one or more planes of flash EEPROM memory cells (not shown) arranged in row and column fashion with row and column decode circuitry and other circuitry utilized for accessing the memory cells of the array 21. Address, control, and data signals used in storing data in the array are furnished from the system bus 12 illustrated in FIG. 1 to the memory 20 by means of a user interface circuit 22. The user interface 22 receives all instructions and data to be transferred to and from storage, interprets those instructions, and sees that they are appropriately carried out. The user interface includes a number of elements which assist in accomplishing these operations including a command state machine 23 which interprets the various instructions and provides instructions to other elements of the user interface and to a microprocessor circuitry 24 which controls the operations of reading, programing, and erasing the array 21. The user interface circuitry 22 also includes various status registers 25 from which data may be read by the central processing unit of the computer system with which the memory 20 is associated to indicate the state of and various conditions within the array 21 and the associated control circuitry. The interface circuitry 22 also includes circuitry 26 by which data and addresses may be queued in order that a number of instructions may be executed in a pipelined fashion in order to accelerate the operation of the memory 20.

In addition to the user interface circuitry 22 and the microprocessor circuitry 24, the memory 20 includes power supply circuitry 27 which furnishes power to the array 21 including the various high voltages necessary to accomplish the erasing and programming of the memory cells. The connection of the various sources of the power supply circuitry 27 and the control of the various operations of the array 21 are accomplished, in general, through an input/output interface circuit 28 controlled by the microprocessor circuitry 24. This interface circuit 28 includes circuitry connecting to a read path arrangement 29 through which data may be read from the array 21 to the bus 12 of FIG. 1. A more detailed description of the circuitry of FIG. 2 is provided in the co-pending U.S. patent application Ser. No. 08/086,186, entitled *Flash Memory Array System and Method*, referred to above.

Figure 3:
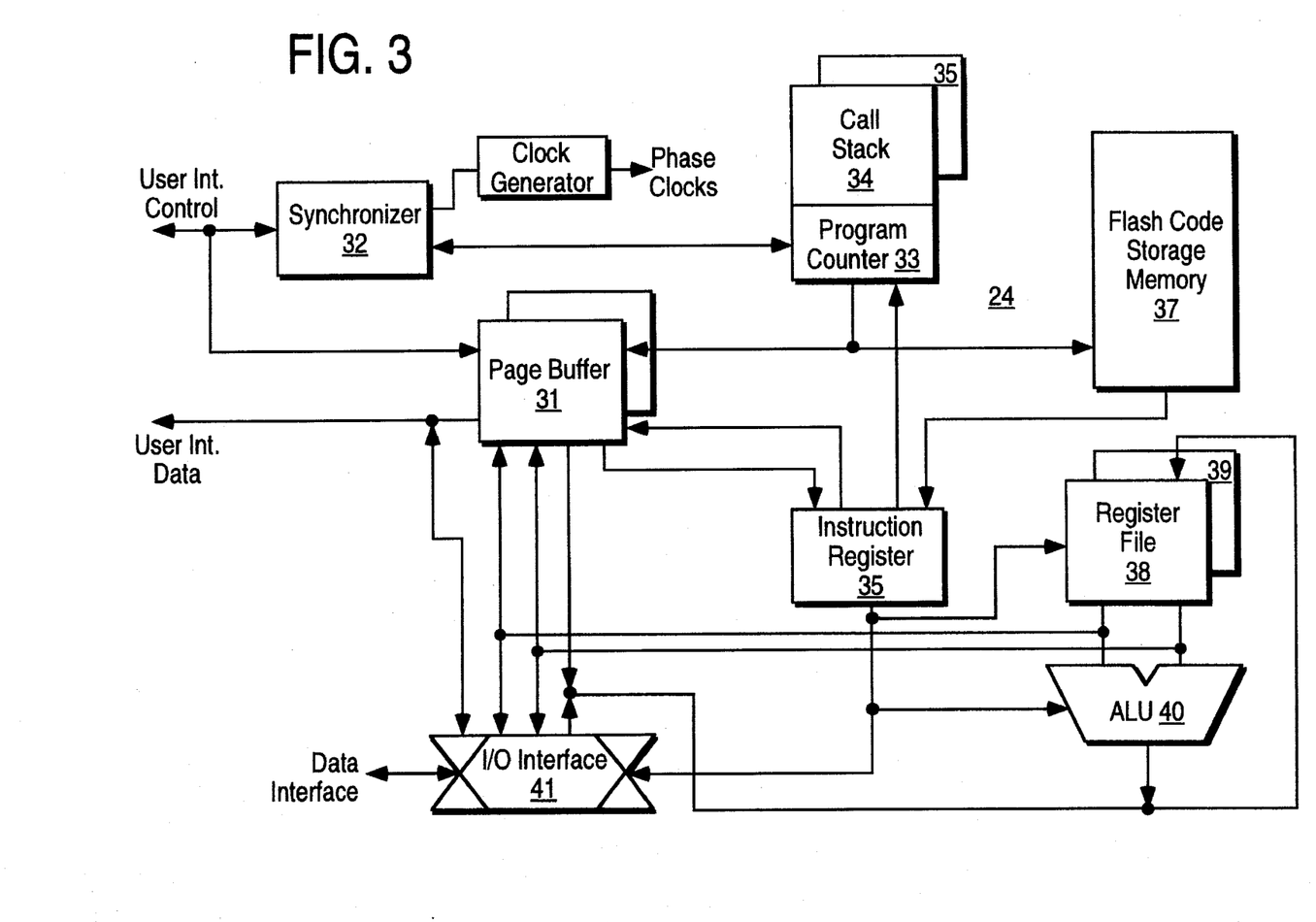
FIG. 3 is a block diagram illustrating a microprocessing unit which may be utilized in the memory array of FIG. 2.

FIG. 3 is a block diagram of the microprocessor circuitry 24 of FIG. 2. The microprocessor 24 receives data and instructions at a page buffer circuit 31 from the user interface circuitry 22. A synchronizer circuit 32 receives the various control signals necessary for controlling the operation of the microprocessor 24 and synchronizes those signals to the operation of the microprocessor 24. The synchronizer circuit 32 also controls the generation of the various phases of clock signals required for the operation of the microprocessor 24. The synchronizer circuit 32 furnishes control signals to a program counter circuit 33. The program counter circuit 33 is one of the primary circuits utilized in carrying out the functions of the present invention. As may be seen in the figure, the program counter circuit 33 includes a pair of call stack circuits 34 and 35 which are utilized in the execution of various processes by the microprocessor 24. The microprocessor 24 also includes an instruction register 36, a flash code storage memory 37 which includes storage for the code implementing the various instructions used by the microprocessor 24, a pair of register files 38 and 39, an arithmetic and logic unit 40, and an input/output interface circuitry 41.

Figure 5:
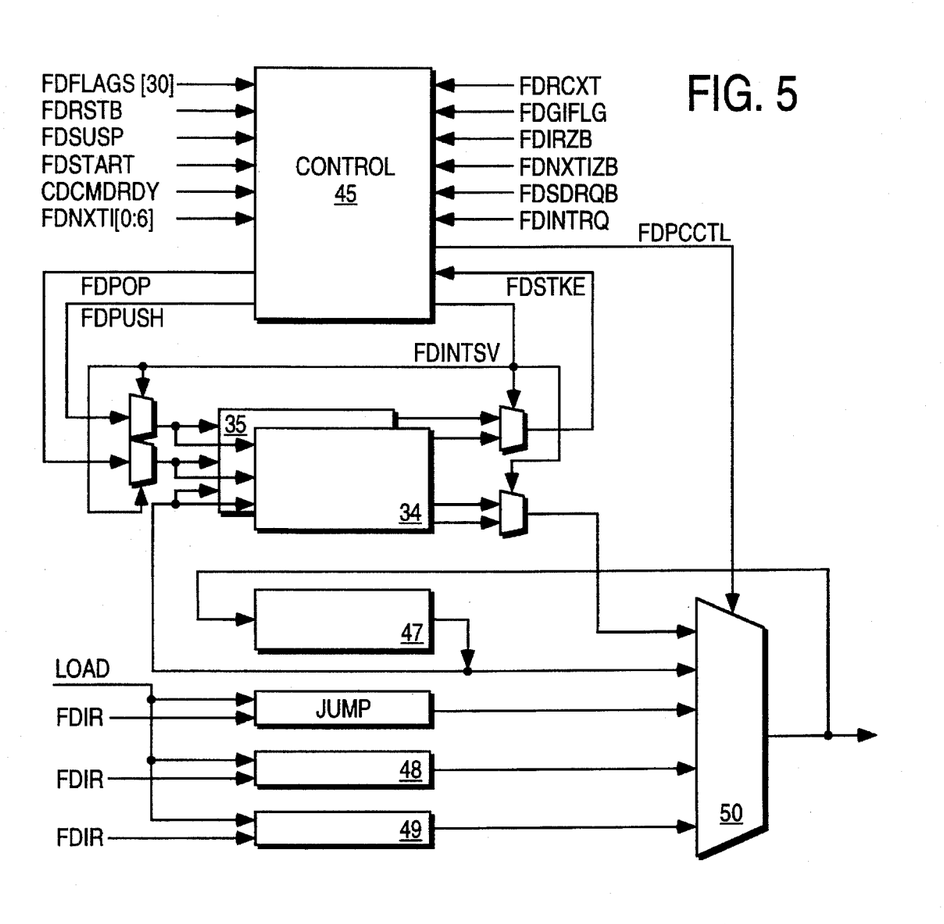
FIG. 5 is a block diagram illustrating a portion of the processing unit of FIG. 3 utilized in the invention.
Figure 6:
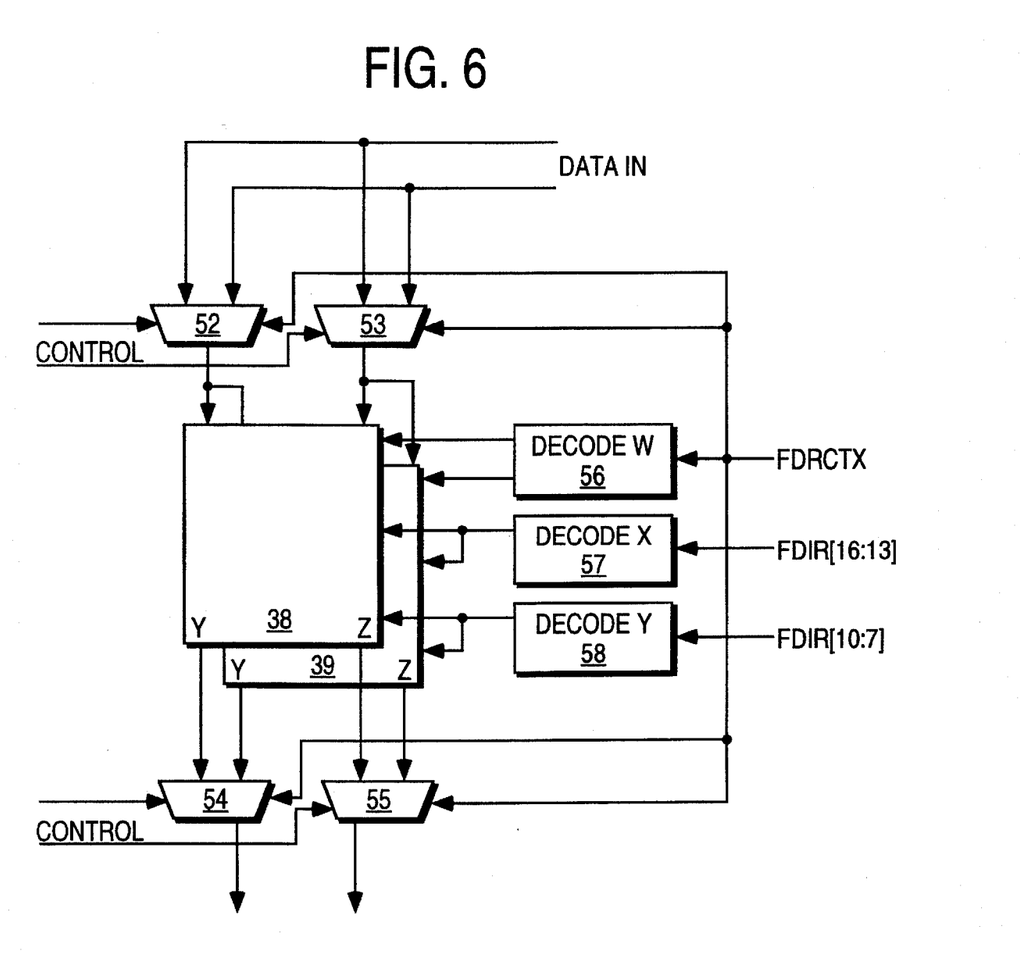
FIG. 6 is a block diagram illustrating another portion of the processing unit of FIG. 3 utilized in the invention.

Referring now to FIGS. 5 and 6, there are illustrated more detailed block diagrams of circuitry utilized in implementing the present invention including the program counter circuit 33, the pair of call stacks 34 and 35, and the pair of register flies 38 and 39 along with various circuitry for controlling the operations of the circuitry. The program counter circuit 33 includes a control circuit 45 which receives the various control signals and sends out signals for controlling the remainder of the microprocessor circuitry 24. The control circuit 45 provides various signals in response to the control signals which it receives for control operations of the call stacks 34 and 35 and for utilizing the registers of the pair of register files 38 and 39. In the preferred embodiment, the control circuit 45 is a state machine constructed in a manner well known to those skilled in the prior art for providing particular sets of output signals in response to selected input signals.

The program counter circuit 33 also includes a counter circuit 47 which is used to increment addresses used to carry out any particular process. Also included in circuit 33 are an interrupt start register 48 which is used to store the starting address of an interrupt start process or routine (ISR) for any particular process which is being run, and an interrupt return register which stores the starting address of an interrupt return routine (IRR) for the particular process which is being run by the microprocessor circuitry 24. A multiplexor 50 is utilized to select among the data stored in the registers 48 and 49 among others as well as the address in the counter 47 or in the call stack 38 or 39.

A pair of multiplexors 52 and 53 are utilized to select information to be transferred to the register files 38 and 39. Another pair of multiplexors 54 and 55 control which data may be taken from the register files 38 and 39. W, X, and Y decode circuits 56, 57, and 58 are also provided for providing access to the register files 38 and 39. Various control signals (shown generally as "control") are provided to operate the multiplexors 52, 53, 54, and 55 to access the registers of the register files 38 and 39 in the operations described herein as well as other operations not pertinent to this invention.

Figure 4:
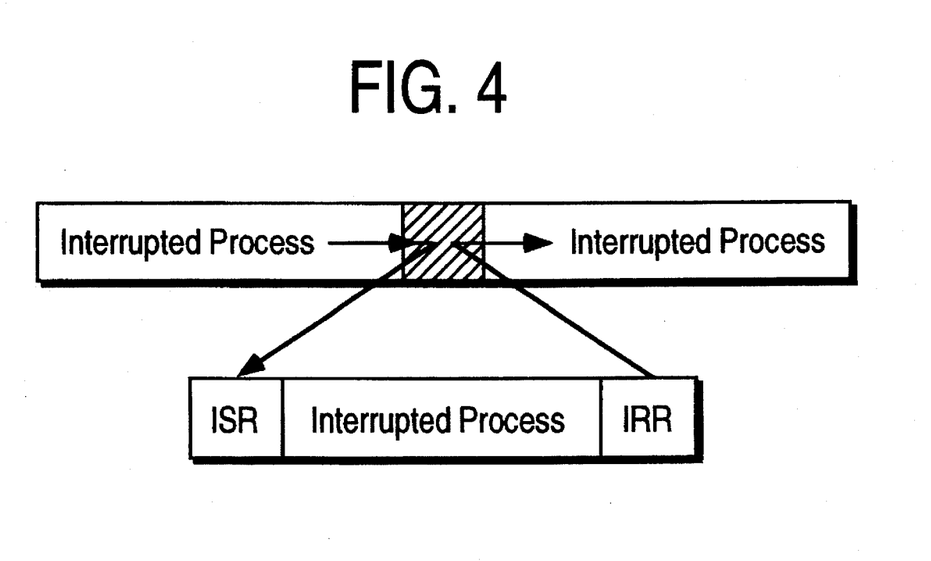
FIG. 4 is a diagram illustrating the flow of an interrupt operation which may utilize the present invention.

The basic operation of the arrangement illustrated in FIGS. 5 and 6 has been outlined above. For example, as is shown in the flow diagram of FIG. 4, if a process which is able to be interrupted (such as the process used for erasing the memory array of FIG. 2) is running on the microprocessor circuitry 24, that process will include a process referred to as an interrupt start process (ISR) and another referred to as an interrupt return process (IRR). Each of these individual processes includes steps specifically adapted to allow the interruption of the particular process without damage to the cells of the memory array or to the data which they hold. As pointed out, this may include in the case of an ISR for an erase routine, steps used to shut down the various power sources utilized in an orderly sequence adapted to provide the necessary protections for the array and the data stored therein. It may include in the case of an IRR used to recommence an erase process, a sequence of steps adapted to place the process in the proper position to be rerun with the proper sources of power available. In the case of an IRR, this may require that the particular IRR for the interrupted process place the microprocessor circuitry 24 in a position to run one or more processes necessary to bring the interrupted process to its appropriate operating position. FIG. 4 illustrates the flow of operations through the interrupted process to the ISR process, then to the running of the interrupting process, and finally to the restart of the interrupted process.

Figure 7:
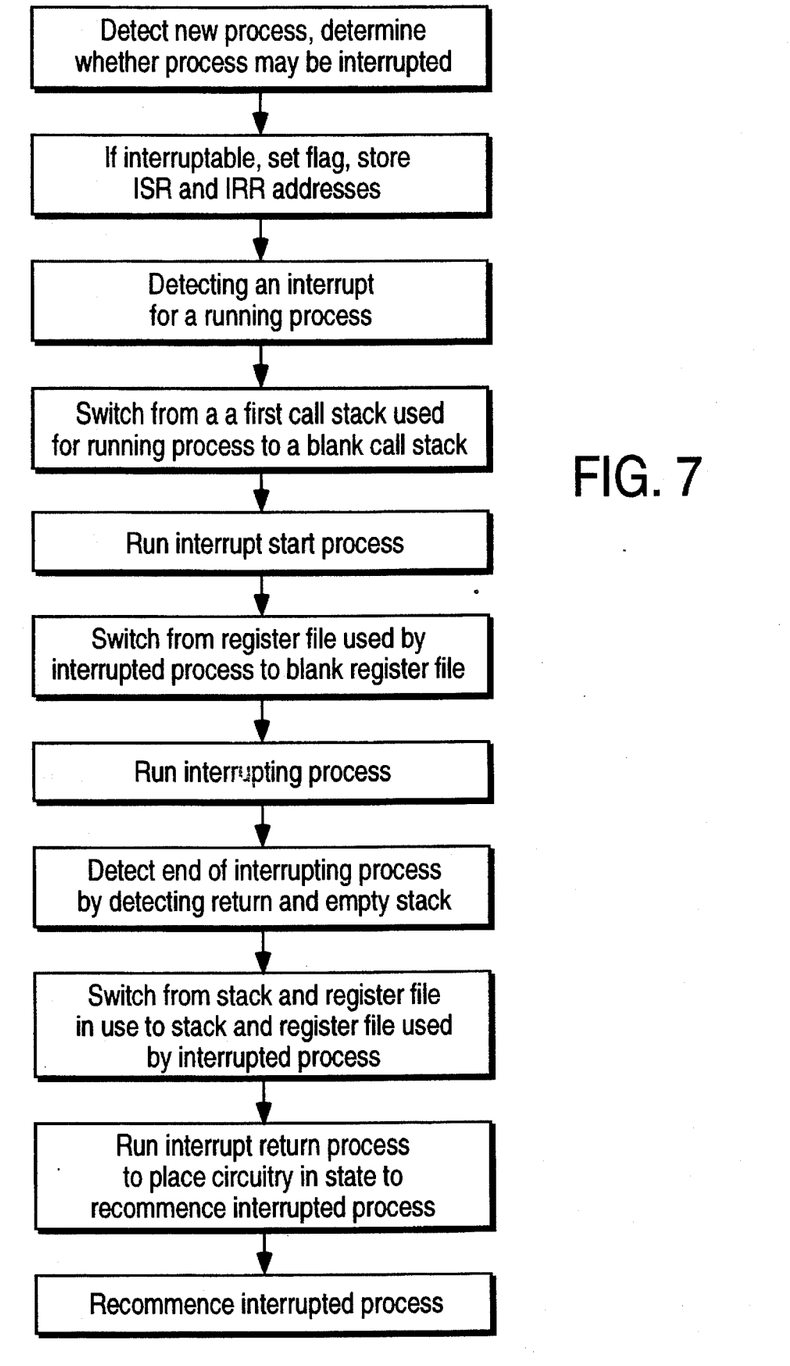
FIG. 7 is a flow chart illustrating a method in accordance with the invention.

The process for running an interrupt in the embodiment of the invention illustrated in FIGS. 3, 5, and 6 is shown in the flow chart of FIG. 7. When a new instruction is received, the instruction is transferred to the instruction register 35 illustrated in FIG. 3. The instruction address is transferred to the counter circuit 47 where it is latched so that the desired address may be accessed. Thereafter, the address in the counter 47 is utilized for an individual step of the process and is typically incremented by the counter to obtain the next step. A jump register may be utilized to execute any jump instruction in the process.

One of the details of processing an instruction requires that a flag be set within a latch in the control circuit 45 if the instruction is interruptible to indicate that fact. If the instruction is interruptible, an address for the ISR routine used by that process will have been stored in the ISR register 48, and an address for the IRR routine used by that process will have been stored in the IRR register 49. If these setup conditions have been accomplished, then an interrupt process may commence.

If it is desired to interrupt the process running on the microprocessor 24, a signal CDCMDRDY is transferred to the control circuit 45; the signal CDCMDRDY is used to initiate any new operation. Presuming that the process being run is interruptible as determined by the condition of the flag in the control circuit 45, the interrupt signal initiates an interrupt request signal FDINTRQ which signifies an interrupt is allowed. One clock cycle later, an interrupt service signal FDINTSV is initiated. The signal FDINTSV switches a pair of multiplexors providing input signals to the call stacks 34 and 35 so that inputs to the call stack 34 being utilized for the process being run and being interrupted are disabled; and a new clean call stack 35 is enabled to store data related to the ISR process.

At this point, the first step in the ISR routine is retrieved from the memory using the address stored in the ISR register 48, and the address in the register 48 is placed in the counter 47 so that it may be incremented to provide the next address for the ISR routine. The ISR routine runs through its various steps using the call stack 35 until it is completed. The completion of the ISR routine is signified by a return command which is the last command of the ISR routine. This return command appears at an input terminal to the control circuit 45 shown as the next instruction signal FDNXTI. If the ISR routine is complete, the call stack 35 will be empty at this point (at its initial position) causing a signal FDSTKE to be generated by the call stack 35 to the control circuit 45. The simultaneous appearance of the return signal and an empty stack signifies the completion of the ISR routine. This causes the signal FDINTRQ to be deasserted and the signal FDRCXT to be asserted. The signal FDRCXT is the logical AND of the assertion of the FDINTSV and the deassertion of the FDINTRQ signal. The signal FDRCXT causes the register files to switch from the register file 38 and utilize the register file 39. Thus, there is provided a new set of register files for use by the interrupting routine and the register files used by the interrupted process are left undisturbed so that the data they contain is immediately available when the interrupted process is recommenced.

The register file switching is controlled by the signal FDRCXT which controls the multiplexors 53 and 54 to select data to be read from the register file 39 when the signal FDRCXT is asserted. Writing to the register file 38 or 39 is also controlled by the signal FDRCXT which controls the W decode circuit to provide that the write lines of the second register file 39 are active when the signal FDRCXT is asserted and the write lines of the normal register file 38 are active when the signal FDRCXT is deasserted. Normal control of the multiplexors 53 and 54 is provided by control signals in general unrelated to those discussed here are shown in the figure as the signal control. During the running of interrupts, signals furnished to control register files 38 and 39 by the control circuit 60 have no significance.

At this point, the interrupting routine begins running using the blank stack 35 and the register files 39. The interrupting process is run is the same manner as are other processes which have been described. During this process, the signals FDINTSV and FDRCXT continue to be asserted. Eventually, the process will end with a return command and an empty stack. This signifies to the control circuit 45 that the process is complete, and the signals FDINTSV and FDRCXT are deasserted. This causes the call stacks and the register files to be switched to make the call stack 34 active and the register file 39 active. The IRR routine is then begun by selecting the address in the IRR register 49. The IRR routine is run and eventually places the memory 20 in a condition in which the interrupted process may recommence without damage to the array or to data.

Thus, as has been seen, the present invention provides circuitry and a method by which interrupts may be run utilizing ISR and IRR routines which allow various control procedures to be run to place the circuitry of the memory in an appropriate safe condition. The circuitry of the present invention allows the implementation of these advantageous procedures while providing very rapid context switching because it is unnecessary to take additional steps to store and retrieve the interrupted routine in order to save state when an interrupt occurs. This allows a very rapid implementation of the interrupt technique even though the various steps necessary to the ISR and the IRR routines tend to lengthen the interruption process. The context switching uses the unique process of sensing a return instruction with an empty stack to accomplish its purpose. This allows normal processes ending with a return to be utilized much in the manner subroutines are utilized without requiring any special steps to be taken in order to accomplish the context switch thereby speeding the interrupt operation. It would be possible to utilize any command signifying the end of a routine other than the "return" command to combine with the empty stack to provide the context switch of this invention.

Although the invention has been described as utilizing a pair of call stacks and a pair of registers, it would be possible to utilize the present invention in an arrangement including more than two sets of each. Such an arrangement might be used to allow the interruption of an interrupting process. The invention should also be construed to include the duplication of other hardware and software elements used in a process being interrupted in addition to the call stacks and the register files. For example, if multiple stages of interruption are allowed, the registers holding the ISR and IRR addresses might be duplicated and switched with other elements of the context of the process interrupted so that these elements would be immediately available at the conclusion of the additional interrupting process or processes.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a processor system executing processes, a method for interrupting processes, comprising:
    associating a specific interrupt start routine (ISR) and interrupt return routine (IRR) with each process, said ISR comprising steps, when executed, to safely suspend execution of the corresponding process without corruption of the system or data and enable an interrupting process to execute, and said IRR comprising steps, when executed, to safely resume execution of the corresponding process without corruption of the system or data;
    executing a first process, said first process associated with a first ISR and first IRR;
    upon receipt of an interrupt during execution of the first process, executing the first ISR to safely suspend execution of the first process;
    upon completion of execution of the first ISR, servicing the interrupt by executing a corresponding interrupt process;
    upon completion of execution of the interrupting process, executing the first IRR to safely return to execution of the first process; and
    upon completion of execution of the first IRR, continuing execution of the first process.

2. The method as set forth in claim 1, further comprising the step of storing pointers to starting addresses of the first ISR and first IRR at predetermined locations in the processor system, when execution of the first process is initiated, said step of executing the first ISR comprising retrieving the pointer to the starting address of the ISR from the predetermined location and initiating execution of the ISR at the starting address.

3. The method as set forth in claim 1, further comprising the step of executing a second process upon completion of execution of the first process, comprising the steps of:
    upon receipt of an interrupt during execution of the second process, executing a second ISR associated with the second process to safely suspend execution of the second process;
    upon completion of execution of the second ISR, servicing the interrupt by executing a corresponding interrupt process;
    upon completion of execution of the interrupting process, executing the second IRR to safely return to execution of the second process; and
    upon completion of the second IRR, continuing execution of the second process.

4. The method as set forth in claim 1, wherein said processor system comprises a memory requiring specified voltages to perform operations on the memory, said first ISR comprising steps of removing specified voltages in an orderly manner to insure that the memory is not damaged and data stored in the memory is not corrupted.

5. The method as set forth in claim 1, wherein said processor system comprises a memory requiring specified voltages to perform operations on the memory, said first IRR comprising steps of applying specified voltages in an orderly manner to enable the first process to continue execution, to insure that the memory is not damaged and data stored in the memory is not corrupted.

6. The method as set forth in claim 1, wherein said first process comprises steps to erase a Flash memory.

7. The method as set forth in claim 1, wherein said first process comprises steps to program a Flash memory.

8. The method as set forth in claim 1, wherein:

said step of executing a first ISR comprises the step of switching from a first call stack utilized by the first process, to a second unused call stack, said ISR using the second call stack during execution, wherein upon completion of the first ISR, said second call stack is empty;

said step of servicing the interrupt executes a corresponding interrupt process using the second call stack, upon completion of execution of said corresponding interrupt process, said second call stack is empty; and prior to continuing execution of the first process, switching from the second call stack to the first call stack.

9. The method as set forth in claim 8, wherein:

said first process using a first set of register files during execution;

upon completion of execution of the first ISR, further switching from said first register files to a second set of register files to enable the state of the first register files to remain intact for later access by the first process and to provide a separate set of register files during execution of the interrupting process; and prior to continuing execution of the first process, switching from the second set of register files to the first set of register files.

10. The method as set forth in claim 8, further comprising the step of detecting completion of execution of the first ISR by detecting an empty second call stack.

11. An interrupt mechanism for safely interrupting executing processes executed by a processor on a computer system comprising:

at least one interrupt service routine (ISR) and at least one interrupt return routine (IRR), each interruptible process executing having an associated ISR and IRR, each ISR comprising steps, when executed, to safely suspend execution of the corresponding process without corruption of the system or data and enable an interrupting process to execute, and each IRR comprising steps, when executed, to safely resume execution of the corresponding process without corruption of the system or data;

logic to control sequencing of processes when an interrupt is issued such that an ISR associated with the executing process is executed prior to execution of an interrupt process and an IRR associated with the executing process is executed subsequent to execution of the interrupt process, such that when an interrupt is issued during execution of a first executing process, said processor, prior to servicing the interrupt, executes a first ISR associated with the first process to safely suspend execution of the first process, said processor, upon completion of execution of the first ISR, servicing the interrupt by executing a corresponding interrupt process, said processor, upon completion of execution of the interrupting process, executing a first IRR associated with the first process to safely return to execution of the first process, and upon completion of execution of the first IRR, said processor continuing execution of the first process.

12. The interrupt mechanism as set forth in claim 11, further comprising a first call stack and second call stack, said first call stack utilized by the first process and said second call stack utilized by the first ISR during execution, and by said second interrupt process during execution.

13. The interrupt mechanism as set forth in claim 12, further comprising a first set of register files utilized by the first process during execution, and a second set of register files utilized by the interrupting process to enable the state of the first register files to remain intact for later access by the first process and to provide a separate set of register files during execution of the interrupting process.

14. A computer system comprising:

a processor that executes processes;

a memory coupled to the processor;

an interrupt mechanism comprising at least one interrupt start routine (ISR) and at least one interrupt return routine (IRR), each interruptible process executing having an associated ISR and IRR, each ISR comprising steps, when executed, to safely suspend execution of the corresponding process without corruption of the system or data and enable an interrupting process to execute, and each IRR comprising steps, when executed, to safely resume execution of the corresponding process without corruption of the system or data;

logic to control sequencing of processes when an interrupt is issued such that an associated ISR is executed prior to execution of an interrupt process and an associated IRR is executed subsequent to execution of the interrupt process, such that when an interrupt is issued during execution of a first executing process, said processor, prior to servicing the interrupt, executes a first ISR associated with the first process to safely suspend execution of the first process, said processor, upon completion of execution of the first ISR, servicing the interrupt by execution a corresponding interrupt process, said processor, upon completion of execution of the interrupting process, executing a first IRR associated with the first process to safely return to execution of the first process, and upon completion of execution of the first IRR, said processor continuing execution of the first process.

15. The computer system as set forth in claim 14, wherein the memory is a flash EEPROM memory requiring specified voltages to perform operations on the memory, said first ISR comprising steps of removing specified voltages in an orderly manner to insure that the memory is not damaged and data stored in the memory is not corrupted.

16. The computer system as set forth in claim 14, wherein the memory is a flash EEPROM memory requiring specified voltages to perform operations on the memory, said first IRR comprising steps of applying specified voltages in an orderly manner to enable the first process to continue execution, to insure that the memory is not damaged and data stored in the memory is not corrupted.

17. The computer system as set forth in claim 14, further comprising a first call stack and second call stack, said first call stack utilized by the first process and said second call stack utilized by the first ISR during execution, and by said second interrupt process during execution.

18. The computer system as set forth in claim 17, further comprising a first set of register files utilized by the first process during execution, and a second set of register files utilized by the interrupting process to enable the state of the first register files to remain intact for later access by the first process and to provide a separate set of register files during execution of the interrupting process.

19. An interrupt mechanism for safely interrupting executing processes executed by a processor on a computer system comprising:

at least one interrupt service routine (ISR) and at least one interrupt return routine (IRR), each interruptible process executing having an associated ISR and IRR, each ISR comprising steps, when executed, to safely suspend execution of the corresponding process without corruption of the system or data and enable an interrupting process to execute, and each IRR comprising steps, when executed, to safely resume execution of the corresponding process without corruption of the system or data;

means for controlling sequencing of processes when an interrupt is issued such that an associated ISR is executed prior to execution of an interrupt process and an associated IRR is executed subsequent to execution of the interrupt process, such that when an interrupt is issued during execution of a first executing process, said processor, prior to servicing the interrupt, executes a first ISR associated with the first process to safely suspend execution of the first process, said processor, upon completion of execution of the first ISR, servicing the interrupt by execution a corresponding interrupt process, said processor, upon completion of execution of the interrupting process, executing a first IRR associated with the first process to safely return to execution of the first process, and upon completion of execution of the first IRR, said processor continuing execution of the first process.

* * * * *